Dec. 2, 1941.                G. ISAAC                2,264,840
                             TIN SNIPS
                        Filed July 15, 1940
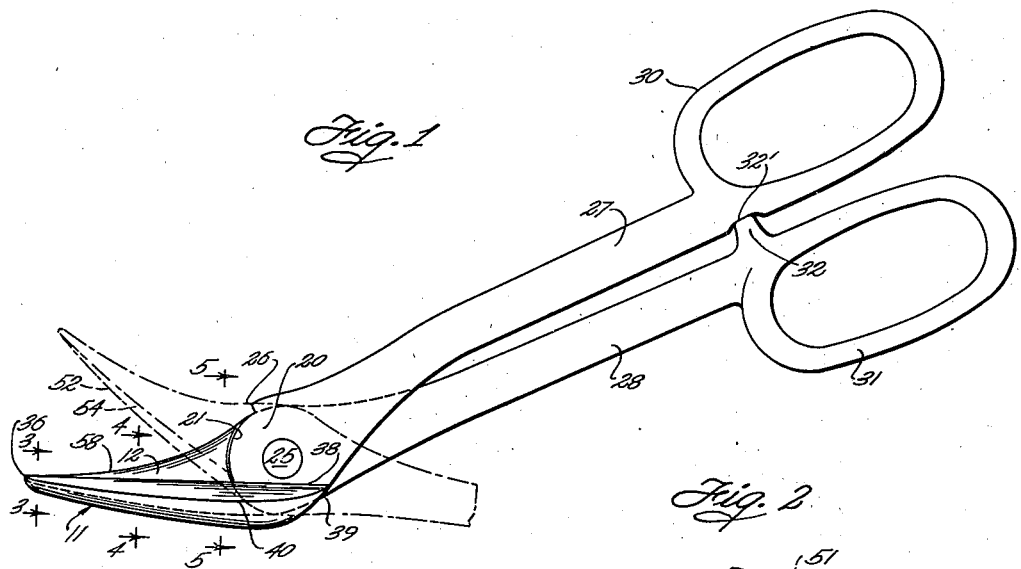
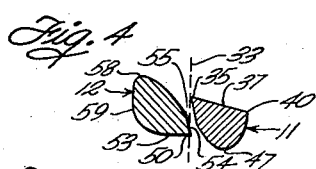
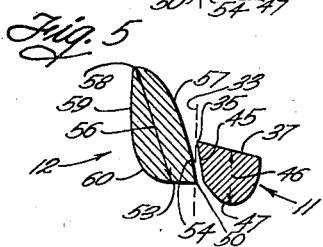
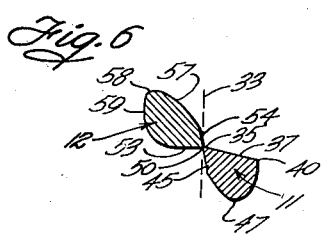
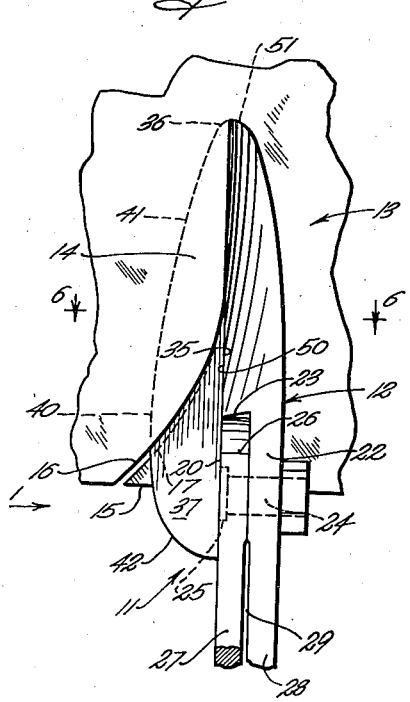
Inventor
GEORGE ISAAC
By Hazard & Miller
Attorneys Patented Dec. 2, 1941

2,264,840

UNITED STATES PATENT OFFICE 2,264,840

TIN SNIPS

George Isaac, Shafter, Calif., assignor to Janzen-Moore Cutlery Company, Shafter, Calif., a partnership composed of Henry C. Janzen and Darwin O. Moore Application July 15, 1940, Serial No. 345,581

7 Claims. (Cl. 30—254)

My invention relates to so-called tin snips especially designed for cutting flat or nearly flat sheet metal for the purpose of making curve cuts. It is frequently necessary in the cutting of sheet metal to cut curves of various radii, many of these curves in a sense spiralling, which is difficult with the ordinary type of tin snips or shears. With my special type of shears however, curved cuts may be readily made with the sheet passing over a platen blade which may be considered as a stationary blade as regards the shear action cooperating with a deep sectioned upper blade. A feature of my invention in employing the flat surfaced platen is that the sheet metal readily slides over such surface and facilitates the turning of either the shears or the sheet worked upon to form the curved cut. With my invention it is preferable to construct the shears in lefts and rights, that is, having the platen blade either on the left hand or the right hand side as the curves can be made much more readily if for instance the convex edge of the curve passes over the platen and the concave cut edge of the sheet metal passes below the platen.

My invention relates to a type of shear or snips in which the blades, a hub structure directly connected thereto, shanks extending from the blades and the handles are sufficiently rigid and stiff that they do not spring or yield as the shearing edges cut one over the other. Moreover the pintle or pivot bolt extending through the hubs secures the shearing blades and the hubs so close together that they do not yield or spring apart as the shearing edges pass along each other from adjacent the hub towards the tip as sheet metal is being cut. With many types of sheet metal shears or snips, the cutting edges on account of the material of the blades or the mounting are not always maintained in the plane of their movement of travel in cutting or shearing operation, however, in my construction the cutting edges of both blades always operate in and maintain a position in the same plane during the hinging or pivoting movement of the blades.

Another important feature of my invention in order to have the cutting edges operate in this common plane is that in providing the relief surface backing the cutting edge, these relief clearance surfaces always remain out of contact one with the other as the cutting points on the edges of the blades pass from adjacent the hub to the tips. This leaves therefore a clearance space when the blades are in their fully closed position. This distinct clearance space between the clearance or relief surfaces of the two blades when they are closed and during the cut facilitates the snips being fed forward into the sheet material to be cut. In this advance of the snips they may be twisted to one side as the blades are being opened and then aligned with the line of the cut to be made.

The features of particular importance in my shears relates to the edges of both blades being in a straight line as regards the plane of the cut. The edge of the platen blade is also in a straight line with the upper flat surface of the platen but the edge of the upper or so-called downwardly moving blade has a convex curve from adjacent its hub to the tip considered on the under surface.

My invention is illustrated in connection with the accompanying drawing, in which:

Fig. 1 is a side elevation of the snips taken from the side having the platen, that is, somewhat in the direction of the arrow 1 of Fig. 2, the dotted line showing the position of the upper or moving blade when in its fully raised position.

Fig. 2 is a plan of the blade portion of the snips illustrating a cut through sheet material showing a curve cut.

Fig. 3 is a transverse section of the blades on the line 3—3 of Fig. 1 in the direction of the arrows.

Fig. 4 is a transverse section on the line 4—4 of Fig. 1 in the direction of the arrows.

Fig. 5 is a transverse section on the line 5—5 of Fig. 1 in the direction of the arrows.

Fig. 6 is a transverse section on the line 6—6 of Fig. 2 in the direction of the arrows omitting the sheet material being cut illustrating the points of contact of the cutting edges in the shearing action.

For purposes of definition the blade 11 is designated the platen blade and may be considered as an under or stationary blade as this usually rests on the work table when sheet material is being cut. The other blade 12 is designated as the upper moving blade as this cuts down on sheet material indicated at 13 in Fig. 2. In this illustration a cut is shown curving to the left, that is, with the center of the cut on the side of the platen blade. In making such a cut the under portion of the sheet passes underneath the blade 12 as indicated at 15 and the upper portion of the sheet passes over the upper surface of the platen blade as indicated at 16. This is a convex cut, the concave side of the cut being illustrated at 17. If a straight line cut is being made, the upper part of the sheet passes rearwardly of the platen blade and the other part of the sheet passes rearwardly underneath the upper or moving blade 12. When making a curved cut to the right, that is, with the center on the side or upper blade 12, the upper portion of the sheet passes over the moving blade 12.

The platen blade has a hub 20 with a convex edge 21 and the blade 12 has a complementary hub section 22 with a concave recessed edge 23, these having a close fit retained in adjustment by the pintle bolt 24. This bolt has its head 25 recessed below the plane of the hub 21. The stop shoulder 26 on the upper edge of the hub 20 engages the upper end of the recessed edge 23 and limits the opening movement of the blades. A shank 27 is formed integral with the hub 20 and thus with the platen and a shank 28 is formed integral with the hub 22 and thus with the blade 12. Each of these shanks terminates in a conventional handle and finger grip. The handles while in parallel planes adjacent the hinge separated by a space 29 slightly overlap adjacent the finger grips 30 and 31 so that a stop stud 32 illustrated on the shank 28 engages a slight recess 32' on the shank 27 of the platen blade, thus limiting the movement to the blades in their completely closed position.

Dealing with the characteristics of the platen blade 11, reference being had to Figs. 3, 4, 5 and 6 in which figures the dotted line 33 represents the plane of relative movement of the cutting edges of both of the blades in the opening and the closing movement of the blades, the cut being made in such closing movement, this line 33 is indicated as a straight line and plane including the cutting edges of all of the Figs. 3 to 6. This plane of shear 33 is directly at right angles to the axis of the pintle and thus is in a diametrical plane of the pintle and in direct line with the exposed plane face of the hub 21.

The platen blade has a straight cutting edge 35 extending from the hub 20 to the tip 36 of the two blades. An upper platen or plane surface 37 extends laterally from the cutting edge. The plane surface 37 of the platen blade intersects the flat outer face of the hub 20 on the line 38. These two plane surfaces form an obtuse angle. The cutting edge 35 is a continuation of this angle. This surface 37 terminates at 39 where the shank 27 joins the hub. In plan view as represented in Fig. 2, the outer edge 40 has a gradual convex curvature 41 merging into the sharp convex curve 42 at the trailing end of the platen edge. Extending downwardly from the cutting edge 35 there is the beveled or relief surface 45. This is also a plane surface extending from the hub 20 to the tip of the blade. As the blade decreases in depth from the hub to the tip, manifestly this clearance surface also decreases but maintains the same constant plane. Below the clearance surface 45 there is the relatively deep section indicated by the measurement line 46 with the outer convex contour 47, in cross section. This cross section is substantially the same degree of curvature extending from the bottom of the clearance surface 45 to the outer edge 40 of the platen, the curve only decreases in size from the hub towards the tip of the blade.

The upper or moving blade designated 12 has a cutting edge 50 which is in a plane from the recess 23 to the tip 51. Such edge however has a slight convex curvature as indicated at 52, note Fig. 1, in reference to the dotted line. The under-surface 53 adjacent the cutting edge is substantially at right angles to the plane 33 of the movement of the cutting edges at any cross section and thus has the same slight convex curvature of the edge 52. There is a clearance surface 54 extending upwardly from the cutting edge 50. Such surface thus varies in its height from the inner end portion contiguous to the recess 23 to the tip 51. These clearance surfaces however slightly approach at the tip being proportionate to the cross section of the blades so that when the blades are in their completely closed position as illustrated in Figs. 1 and the cross sections 3, 4 and 5, there is a slight separation space 55 between the clearance surfaces 45 of the platen blade and 54 of the upper or moving blade 12. The blade 12 is much deeper at its main sections indicated by the measurement numeral 56 of Fig. 5 than the depth of the platen blade indicated by the numeral 46. A gradual convex curve 57 extends upwardly from the clearance surface 54 to the upper sharp reverse top 58 from which there is a convex curve 59 leading downwardly to the surface 53 which forms the bottom of the blade, this having a partially rounded corner indicated at 60. Manifestly as this blade 12 tapers from the hub, that is, from the recess 23 to the point, all of these external surfaces are similarly reduced.

The cutting action of the snips is indicated particularly having reference to Figs. 2 and 6, a piece of sheet metal being indicated as partly cut on a curved line with the center of curvature on the platen blade side of the snips. The contact point or slight area of the cutting edges is detailed on the section line 6—6 of Fig. 2, the blades being shown in this cross section in Fig. 6 omitting the sheet being cut. It will therefore be seen that as these edges pass one another, the cutting edges 35 of the platen blade and 50 of the upper blade contact and that the clearance surfaces 45 of the platen and 54 of the upper blade 12 are substantially in alignment. A portion of the sheet metal thus travels rearwardly over the plane surface 37 of the platen blade while the other portion of the sheet is diverted downwardly by the undersurface portion 53 and the corner 60 of the moving blade 12, this being diverted underneath the platen blade as indicated by the dotted lines 17 of Fig. 2. Thus a curve cut may be made without materially distorting the sheet metal. The cutting edges of the blades in their intersection with each other from the root, that is, the portion adjacent the hub to the tip travel in a plane as indicated by the line 33 and as above mentioned there is no bending of the blades or springing of the pintle. It is manifest that the shears may be used for straight line cuts and the same snips may be utilized for curves in both directions, however it is preferable for a workman to have two snips designated lefts and rights as to whether the platen blade is on the left hand side in reference to the handles as shown in Figs. 1 and 2 or on the right hand side.

As above mentioned, the space 55 is formed between the clearance surfaces 45 on the platen blade and 54 on the complementary blade, hence when the blades are in their fully closed position, this space is wider adjacent the hub as shown in Fig. 5 than adjacent the tips of the blades as shown in Fig. 3, this being mainly due however to the closer proximity of the cutting edges of both blades adjacent the tip than adjacent the hubs. It will be therefore seen that in the cutting action my shears distinguish from others now in use in that the surfaces adjacent the cutting edges of the blades do not rub together but as soon as the cut has been made and the cutting edge is passing as shown in Fig. 6, there is an immediate separation of the edges. The upper edge 58 of the moving or upper blade has quite a pronounced concave curve as illustrated in the full and dotted lines of Fig. 1, this merging with the hub at the recess 23, therefore when it is desired to cut curves in the opposite direction to that shown in Fig. 2 in sheet material, the upper portion of a sheet may readily pass over this edge 58. Of course in cutting sharp curves it is preferable to use mainly the portion of the blades towards the tips.

Various changes may be made in the details of the construction without departure from the spirit or scope of the invention as defined by the appended claims.

I claim:

1. A tin snip having an upper and a lower shank each with handles and a stop means, both shanks having a hub with a pivot therethrough combined with the hub connected to the upper shank having a plane surface transverse to the axis of the pivot, a platen blade having a plane upper surface and formed integral with the said hub, the platen blade having a straight line cutting edge located distinctly below the said pivot as regards the shank connected to said blade, the hub of the second shank having an upper blade formed integral therewith and adjacent the hub of much greater depth than the depth of the platen blade, the upper blade having a slightly convex second cutting edge on its underside, said second edge having a movement in opening and closing in a constant plane including the cutting edges of both blades, the said blades tapering from the hub to the tip and in completely closed position the cutting edge of the upper blade being positioned entirely below the cutting edge of the platen blade, each blade having a clearance surface from its cutting edge and when the blades are in fully closed position there being a tapering space between said clearance surfaces from the hubs to the tips of the blades.

2. A tin snip having a first platen blade with a hub and a second blade with a recessed hub to receive the first hub, a pintle through the hubs, the platen blade having a plane upper surface located below the pintle and inclined downwardly relative to the axis of the pintle, such platen blade having a straight cutting edge on a diametrical plane through the pintle and on one side of its plane surface, the second blade connected to the recessed hub having a slightly convex cutting edge operating in the diametrical plane of the pintle of the cutting edge of the platen blade, the second blade being about twice the depth of the platen blade adjacent their respective hubs.

3. A tin snip having a first platen blade with a hub, a second blade having a recessed hub to receive the first hub, a pintle through the hubs, the platen blade having a straight cutting edge in a transverse diametrical plane through the pintle, the platen blade having an upper plane surface forming an acute angle downwardly with the axis of the pintle and located below the pintle, the platen blade having a relief surface from the cutting edge forming an acute angle with the said plane surface, the second blade having a cutting edge from the recessed hub and always movable in the same plane diametrical to the pintle as the cutting edge of the first blade, the cutting edge of the second blade being slightly convex from the hub to the tip and having a relief surface extending upwardly from its cutting edge at an acute angle to the said diametrical plane of both cutting edges, the two blades when the snips are in the closed position having the cutting edge of the second blade below the cutting edge of the first blade and a space between the two clearance surfaces.

4. A tin snip having a first platen blade with a hub, a second blade having a recessed hub to receive the first hub, a pintle through the hubs, the platen blade having a straight cutting edge in a transverse diametrical plane through the pintle, the platen blade having an upper plane surface forming an acute angle downwardly with the axis of the pintle and located below the pintle, the platen blade having a relief surface from the cutting edge forming an acute angle with the said plane surface, the second blade having a cutting edge from the recessed hub and always movable in the same plane diametrical to the pintle as the cutting edge of the first blade, the cutting edge of the second blade being slightly convex from the hub to the tip and having a relief surface extending upwardly from its cutting edge at an acute angle to the said diametrical plane of both cutting edges, the two blades when the snips are in the closed position having the cutting edge of the second blade below the cutting edge of the first blade and a space between the two clearance surfaces, the upper edge of the second blade having a pronounced concave curve when viewed from the axis of the pintle merging with the recessed hub whereby in cutting a curve with the center on the side of the second blade, part of the material cut may pass over the concave upper edge of the second blade.

5. A tin snip having a first platen blade with a first hub having a plane outer face, a second blade having a second recessed hub to accommodate the first hub, a pintle through said hubs, the platen blade having a plane upper surface located below the pintle and forming an obtuse angle with the plane outer face of the first hub, the platen blade having a straight cutting edge forming a continuation of the line of intersection of the plane surface of the platen blade and the plane outer face of the first hub, the second blade having a convex cutting edge from its recessed hub to its tip operating in the plane of the outside face of the first hub, both blades tapering on all sides from their hubs to tips.

6. A tin snip having a first platen blade with a first hub having a plane outer face, a second blade having a second recessed hub to accommodate the first hub, a pintle through said hubs, the platen blade having a plane upper surface located below the pintle and forming an obtuse angle with the plane outer face of the first hub, the platen blade having a straight cutting edge forming a continuation of the line of intersection of the plane surface of the platen blade and the plane outer face of the first hub, the second blade having a convex cutting edge from its recessed hub to its tip operating in the plane of the outside face of the first hub, both blades tapering on all sides from their hubs to tips, the platen blade having a clearance surface from its cutting edge forming from its plane upper surface an acute angle downwardly, the second blade having a clearance surface extending upwardly from its cutting edge and at an acute angle to the plane of the face of the first hub, the said clearance surfaces when the snips are completely closed being spaced apart from the hubs to the tips of the blades.

7. A tin snip having a first platen blade with a first hub having a plane outer face, a second blade having a second recessed hub to accommodate the first hub, a pintle through said hubs, the platen blade having a plane upper surface located below the pintle and forming an obtuse angle with the plane outer face of the first hub, the platen blade having a straight cutting edge forming a continuation of the line of intersection of the plane surface of the platen blade and the plane outer face of the first hub, the second blade having a convex cutting edge from its recessed hub to its tip operating in the plane of the outside face of the first hub, both blades tapering on all sides from their hubs to tips, the platen blade having a clearance surface from its cutting edge forming from its plane upper surface an acute angle downwardly, the second blade having an undersurface from its convex cutting edge at right angles to the plane outer surface of the first hub, the second blade having an upwardly extending clearance surface from its cutting edge at an acute angle to its undersurface, the said clearance surfaces when the snips are completely closed being spaced apart from the hubs to the tips of the blades.

GEORGE ISAAC.